J. D. ANDERSON.
TIRE RIM.
APPLICATION FILED SEPT. 21, 1911.
1,043,658.
Patented Nov. 5, 1912.
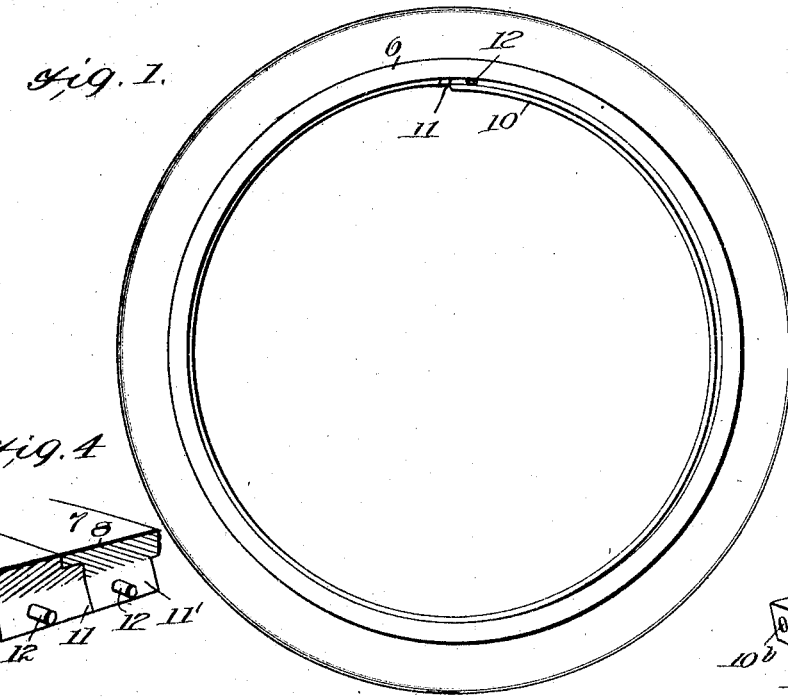
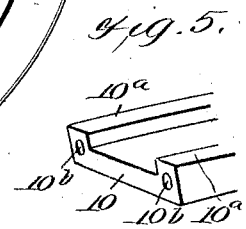
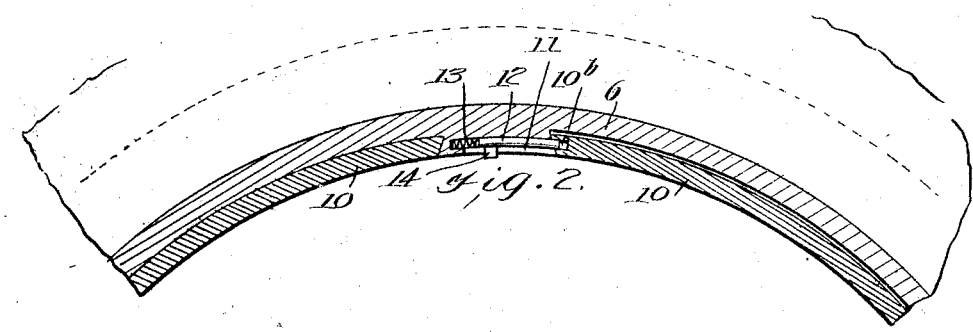
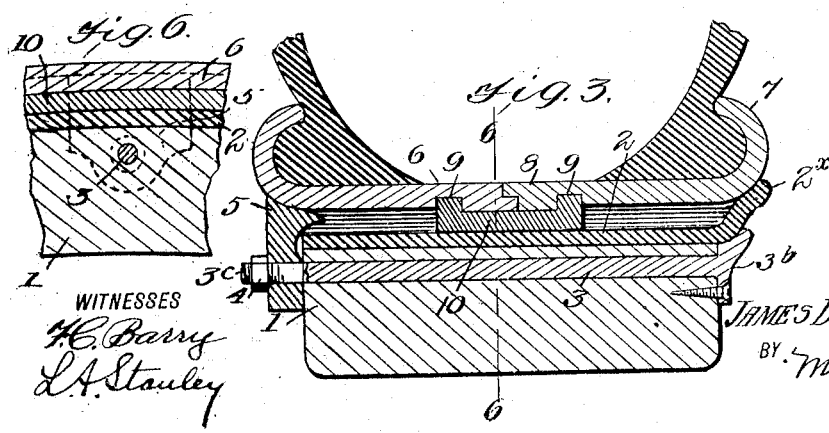
WITNESSES
H. C. Barry
L. A. Stanley
INVENTOR
James D. Anderson
BY Munn & Co
ATTORNEYS

UNITED STATES PATENT OFFICE.

JAMES D. ANDERSON, OF KANSAS CITY, MISSOURI.

TIRE-RIM.

1,043,658.  Specification of Letters Patent.  Patented Nov. 5, 1912.

Application filed September 21, 1911. Serial No. 650,487.

*To all whom it may concern:*

Be it known that I, JAMES D. ANDERSON, a citizen of the United States, and a resident of Kansas City, in the county of Jackson and State of Missouri, have made certain new and useful Improvements in Tire-Rims, of which the following is a specification.

My invention relates to improvements in tire rims for automobiles or other similar vehicles and it consists in the combinations, constructions and arrangements herein described and claimed.

An object of my invention is to provide a rim which will be of relatively light weight and one which will be strong, and which will remain securely in place.

A further object of my invention is to make a divisible rim in which each half is of the same size and strength.

A further object of my invention is to provide a divisible demountable rim having relatively few parts, and being therefore cheap to manufacture.

Other objects and advantages will appear in the following specification and the novel features of the device will be particularly pointed out in the appended claims.

My invention is illustrated in the accompanying drawings in which—

Figure 1 is a side view of a tire rim and lock ring for the latter, Fig. 2 is an enlarged section through the portion of the rim and locking ring, Fig. 3 is a transverse section through the device, Fig. 4 is a perspective view showing the securing lugs carried by the rim sections, Fig. 5 is a perspective view showing the end of the spring locking ring, and Fig. 6 is a section along the line 6—6 of Fig. 3.

In carrying out my invention, I provide a felly 1, which is provided with a rim 2 having a flange 2ˣ on one side thereof. At intervals around the felly I provide transverse bores for the reception of bolts 3. These bolts are provided with heads 3ᵇ of the shape shown in Fig. 3 arranged to engage the flanges 2. The opposite end of the bolt is threaded as shown at 3ᶜ to receive a nut 4. Between the nut and the felly I provide a wedge shaped lug 5 like that shown in Fig. 3.

The divided rim portions are shown at 6 and 7. These are provided with overlapping portions as shown at 8, and each section is provided with a groove 9 arranged to receive one of the flanges 10ᵃ of a spring expansion ring 10 (see Fig. 5). The rim sections 6 and 7 are provided with lugs 11 and 11' on their inner sides in which are disposed a pair of movable bolts 12 (see Figs. 2 and 4) these bolts being normally extended by means of a spring 13 and being arranged to be retracted by means of a laterally extending pin 14.

In assembling the rim the parts 6 and 7 are placed together so that the overlapping edges 8 have the position shown in Fig. 3. The spring expansion ring 10 is then placed in the position shown in Fig. 1, the flanges 10ᵃ entering the slots 9 in the rim sections, and the end of the expansion ring 10 resting on the lugs 11 and 11' as shown in Fig. 1. The spring ring is then forced into the position shown in Fig. 2, the pins 14 being pulled inwardly so as to permit the end of the spring ring to enter behind the beveled edges of the lug 12 as clearly shown in Fig. 2. On releasing the pins 14, the bolts 12 will enter the slots 10ᵇ, thereby securely locking the rim sections together. The rim thus formed is placed on the wheel and the rim section 7 is brought into engagement with the flange 2ˣ. The wedge plate 5 is then placed on the bolt 3 and the nut 4 is screwed up tight. The wedge being curved on its upper edge tends to force the rim against the opposite flange 2ˣ and also to wedge the rim tightly upon the felly band, thus preventing any chance of the rim becoming detached from the felly.

It will be seen that the device is comparatively simple in its nature, and yet the parts are securely held in place.

In removing the rim, it is only necessary to take off the nut 4, remove the plate 5, slip off the rim, pull back the extensions 14 when the spring ring may be easily taken out and the two parts of the rim section will fall apart.

I claim:

1. The combination of a pair of rim sections, each section being provided with a curved outer flange and a portion adapted to overlap the other section, said rim sections being each provided with a circumferential groove on its inner side adjacent to and parallel with said overlapping portions, a split spring locking ring having a pair of flanges arranged to enter the grooves in said rim members, the ends of said ring being beveled and one end being provided with sockets, a lug carried by each of said rim members, each of said lugs having its ends beveled to provide recesses for the beveled ends of said spring ring, and a spring pressed bolt slidably carried by each lug and arranged to enter a socket in the end of the spring ring member.

2. The combination with a pair of abutting rim sections each having a groove on its inner side parallel to the abutting portions, of a split locking ring having its ends beveled and being provided with flanges arranged to enter said grooves, one end of said locking ring being provided with sockets, a lug carried by each of said rim sections, said lugs being beveled to receive the beveled ends of said spring ring, and a movable locking member carried by each lug and arranged to enter a socket in the end of said split ring for locking the ring in position.

3. The combination with a pair of abutting rim sections each having a groove on its inner side parallel to the abutting portions, of a split locking ring having its ends beveled and being provided with flanges arranged to enter said grooves, an integral lug carried by each of said rim sections, said lugs being beveled to receive the beveled ends of said split ring, and means carried by each lug for locking the ring in position.

4. The combination with a pair of abutting rim sections each having a groove on its inner side parallel to the abutting portions, of a split locking ring having its ends beveled and being provided with flanges arranged to enter said grooves, and an integral lug carried by each of said rim sections, each of said lugs being beveled to receive the beveled ends of said split ring.

JAMES D. ANDERSON.

Witnesses:
  J. D. YOAKLEY,
  R. A. STANLEY.